US011133719B2

(12) United States Patent
Mayer et al.

(10) Patent No.: US 11,133,719 B2
(45) Date of Patent: Sep. 28, 2021

(54) MOTOR WINDING CONNECTOR RING

(71) Applicant: Atieva, Inc., Newark, CA (US)

(72) Inventors: Jeremy Mayer, Mountain View, CA (US); Emad Dlala, Pleasanton, CA (US)

(73) Assignee: Atieva, Inc., Redwood City, CA (US)

(*) Notice: Subject to any disclaimer, the term of this patent is extended or adjusted under 35 U.S.C. 154(b) by 168 days.

(21) Appl. No.: 16/453,029

(22) Filed: Jun. 26, 2019

(65) Prior Publication Data

US 2020/0412195 A1 Dec. 31, 2020

(51) Int. Cl.
*H02K 3/50* (2006.01)
*H02K 3/02* (2006.01)
(Continued)

(52) U.S. Cl.
CPC ........... *H02K 3/50* (2013.01); *H02K 3/02* (2013.01); *H02K 3/38* (2013.01); *B60K 6/26* (2013.01);
(Continued)

(58) Field of Classification Search
CPC ...... H02K 2203/09; H02K 3/522; H02K 3/50; H02K 5/225
See application file for complete search history.

(56) References Cited

U.S. PATENT DOCUMENTS 7,187,095 B2 * 3/2007 Kokubu ............... H02K 5/148
310/68 B
7,579,732 B2 * 8/2009 Yamaguchi ............ H02K 3/50
310/43
(Continued)

FOREIGN PATENT DOCUMENTS

DE 102016114723 A1 2/2018
EP 2824765 A1 1/2015
(Continued)

OTHER PUBLICATIONS

Office Action for Japanese Application No. 2020-084796, dated Apr. 20, 2021, along with English translation, 8 pages.
(Continued)

*Primary Examiner* — Dang D Le
(74) *Attorney, Agent, or Firm* — Brake Hughes Bellermann LLP

(57) ABSTRACT

A stator assembly is provided that simplifies the process of coupling the stator windings to the winding lugs. The stator assembly includes a pre-fabricated connector that is attached to the stator via a plurality of stator winding terminations. The pre-fabricated connector includes a plurality of electrically conductive termination coupling members that form conductive pathways between at least a portion of the stator winding terminations and a plurality of bus bars, where each of the bus bars includes a lug. The pre-fabricated connector may also include a second plurality of electrically conductive termination coupling members that form conductive pathways between at least a second portion of the stator winding terminations and a plurality of lugless bus bars. An electrically insulating material is overlaid over portions of the connector ring, thereby preventing contact or partial discharge between the various bus bars.

25 Claims, 9 Drawing Sheets

(51) Int. Cl.
*H02K 3/38* (2006.01)
*B60K 6/26* (2007.10)

(52) U.S. Cl.
CPC ....... *B60Y 2200/91* (2013.01); *B60Y 2200/92* (2013.01); *B60Y 2400/60* (2013.01); *H02K 2203/09* (2013.01)

(56) References Cited

U.S. PATENT DOCUMENTS

| | | | |
|---|---|---|---|
| 8,120,216 B2 * | 2/2012 | Sakata | H02K 3/522 |
| | | | 310/71 |
| 8,497,617 B2 * | 7/2013 | Dang | H02K 3/12 |
| | | | 310/201 |
| 9,079,603 B2 * | 7/2015 | Isshiki | H02K 3/522 |
| 2003/0214190 A1 | 11/2003 | Congdon et al. | |
| 2013/0076175 A1 | 3/2013 | Turnbull et al. | |
| 2016/0036187 A1 | 2/2016 | Houzumi et al. | |
| 2018/0006522 A1 | 1/2018 | Hiramitsu et al. | |
| 2020/0014272 A1 | 1/2020 | Asahi et al. | |

FOREIGN PATENT DOCUMENTS

| | | |
|---|---|---|
| JP | H09238440 A | 9/1997 |
| JP | 2000134851 A | 5/2000 |
| JP | 2008125170 A | 5/2008 |
| JP | 2008187875 A | 8/2008 |
| JP | 2010011627 A | 1/2010 |
| JP | 2015171245 A | 9/2015 |
| WO | 2011108734 A1 | 9/2011 |
| WO | 2016117513 A1 | 7/2016 |
| WO | 2017162568 A1 | 9/2017 |
| WO | 2018179790 A1 | 10/2018 |

OTHER PUBLICATIONS

Extended European Search Report for European Application No. 20174733A, dated Oct. 30, 2020, 8 pages.

* cited by examiner

MOTOR WINDING CONNECTOR RING

FIELD OF THE INVENTION

The present invention relates generally to electric motors and, more particularly, to an electric motor design that simplifies the process of connecting to the motor's stator windings.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drivetrains into their vehicle line-ups. To meet consumer expectations, however, the automobile industry must not only achieve a greener drivetrain, but must do so while maintaining reasonable levels of performance, range, reliability, safety and cost.

In recent years, electric vehicles have proven to be not only environmentally friendly, but also capable of meeting, if not exceeding, consumer desires and expectations regarding performance. While early electric vehicles used DC motors in order to achieve the variable levels of speed and torque required to drive a vehicle, the advent of modern motor control systems utilizing direct torque control have allowed AC motors to deliver the same level of performance while providing the many benefits associated with AC motors including small size, low cost, high reliability and low maintenance.

In an AC motor a rotating magnetic field is generated within the motor's stator assembly, resulting in rotation of the motor's rotor assembly. The rotating magnetic field is generated by a plurality of circumferentially distributed windings that are mounted within a plurality of circumferentially distributed stator slots and teeth. The windings, which may be comprised of round or rectangular wire, are divided into coil groups, each of which represents a single pole of a single phase. Each phase of the coil windings terminate into a connector, commonly referred to as a lug, which is used to couple the coil windings to an AC power source. Thus, for example, in a typical three phase stator assembly there are three winding lugs that connect the stator windings to the three phases of an AC inverter.

In a typical stator manufacturing process, distributing the windings within the stator assembly is a rapid process utilizing an automated CNC (computer numerical control) winding machine. Once the stator windings are completed, they must be coupled to the stator lugs. During this portion of the stator manufacturing process the wire bundles are routed, insulation sleeves are added, and the lugs are resistance welded to the wire bundles. As this portion of the process is performed by hand, it is quite slow and adds considerable expense to the stator assembly. Accordingly, what is needed is a stator manufacturing process that minimizes or eliminates the need for manually performing the final steps associated with coupling the windings to the lugs, thereby providing a more cost effective stator assembly. The present invention provides a system and manufacturing process that achieves these goals while also providing a more versatile stator assembly that may be configured to meet a variety of torque and power requirements.

SUMMARY OF THE INVENTION

The present invention provides a stator assembly for an electric motor that includes (i) a stator with a plurality of windings circumferentially distributed about the stator and which terminate in a plurality of winding terminations, and (ii) a pre-fabricated connector that is attached to the stator via the plurality of winding terminations where the pre-fabricated connector is fabricated prior to attachment to the stator. The pre-fabricated connector includes (i) a first plurality of termination coupling members that are divided into a first plurality of termination coupling member groups, where each termination coupling member of each termination coupling member group of said first plurality of termination coupling member groups is configured to be mechanically and conductively coupled to a different winding termination of the plurality of winding terminations, where each termination coupling member group is mechanically and conductively coupled to one of a plurality of bus bars, and where each bus bar of the plurality of bus bars includes an independent lug; and (ii) an electrically insulating material overlaying portions of the plurality of bus bars and configured to prevent electrical contact or partial discharge between the plurality of bus bars.

In one aspect, each termination coupling member of each termination coupling member group may be (i) laser welded, (ii) TIG welded, (iii) resistance welded, and/or (iv) brazed to a different winding termination of the plurality of winding terminations during attachment of the pre-fabricated connector to the stator.

In another aspect, the assembly may further include a plurality of electrically insulating coupling member overlays configured to prevent electrical contact or partial discharge between the first plurality of termination coupling members. Each of the plurality of electrically insulating coupling member overlays may include a U-shaped end portion that is configured to partially surround a corresponding winding termination, and which may be crimped onto the corresponding winding termination during attachment of the pre-fabricated connector to the stator.

In another aspect, the pre-fabricated connector as fabricated may further include a second plurality of termination coupling members divided into a second plurality of termination coupling member groups, where each termination coupling member of each termination coupling member group of the second plurality of termination coupling member groups is configured to be mechanically and conductively coupled to a different winding termination of the plurality of winding terminations, where each termination coupling member group of the second plurality of termination coupling member groups is mechanically and conductively coupled to one of a plurality of lugless bus bars, and where the electrically insulating material is configured to prevent electrical contact or partial discharge between the plurality of lugless bus bars, and to prevent electrical contact or partial discharge between the plurality of bus bars and the plurality of lugless bus bars. Each termination coupling member of each termination coupling member group may be (i) laser welded, (ii) TIG welded, (iii) resistance welded, and/or (iv) brazed to a different winding termination of the plurality of winding terminations during attachment of the pre-fabricated connector to the stator. The assembly may further include a plurality of electrically insulating coupling member overlays configured to prevent electrical contact or partial discharge between the first plurality of termination coupling members, and between the second plurality of termination coupling members, and between the first and second pluralities of termination coupling members. Each of the plurality of electrically insulating coupling member overlays may include a U-shaped end portion that is configured to partially surround a corresponding winding termination, and which may be crimped onto the corresponding winding termination during attachment of the pre-fabricated connector to the stator.

In another aspect, the first plurality of termination coupling members and the plurality of bus bars may be fabricated from a copper material.

In another aspect, at least a portion of the plurality of bus bars may be over-molded with the electrically insulating material (e.g., plastic) to form the pre-fabricated connector.

In another aspect, the plurality of windings may be comprised of (i) copper wire with a round cross-section, or (ii) copper wire with a rectangular cross-section.

In another aspect, each bus bar of the plurality of bus bars may correspond to a phase of the electric motor.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation; similarly a first step could be termed a second step; similarly a first component could be termed a second component, all without departing from the scope of this disclosure.

The stator assembly described and illustrated herein is generally designed for use in a vehicle utilizing an electric motor, e.g., an electric vehicle (EV), although it should be understood that it is equally applicable to electric motors designed for use in other applications. As used herein, the terms "electric vehicle" and "EV" are interchangeable and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

The stator assembly fabrication technique of the present invention provides a connector that simplifies the process of connecting the wire windings of the stator to the stator lugs. The connector of the invention is preferably used with a stator in which the stator windings terminate in a relatively small number of terminations, and preferably in which those winding terminations are adjacent or in close proximity to one another.

Figure 1:
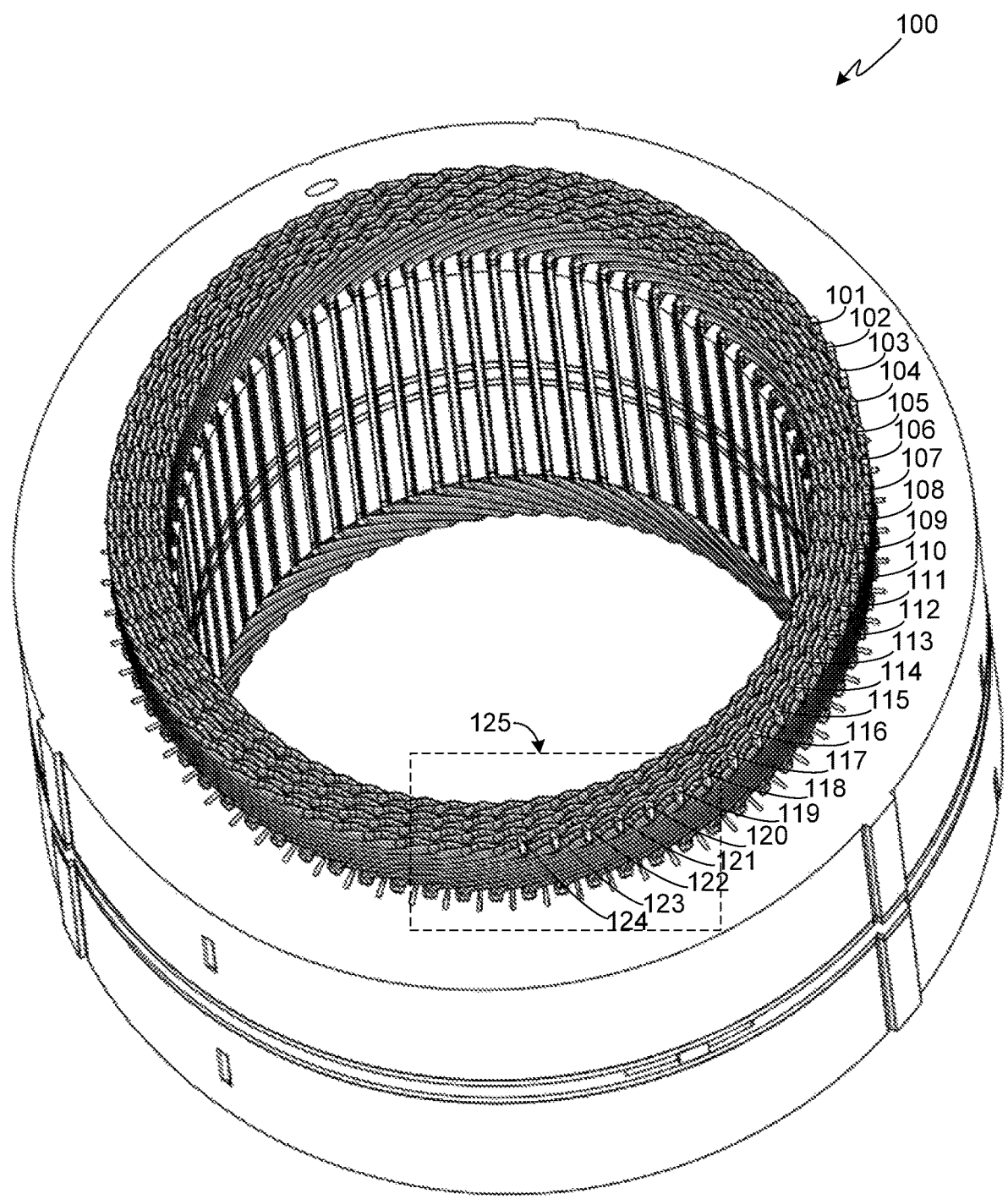
FIG. 1 provides a perspective view of a stator, this view highlighting the stator winding terminations.
Figure 2:
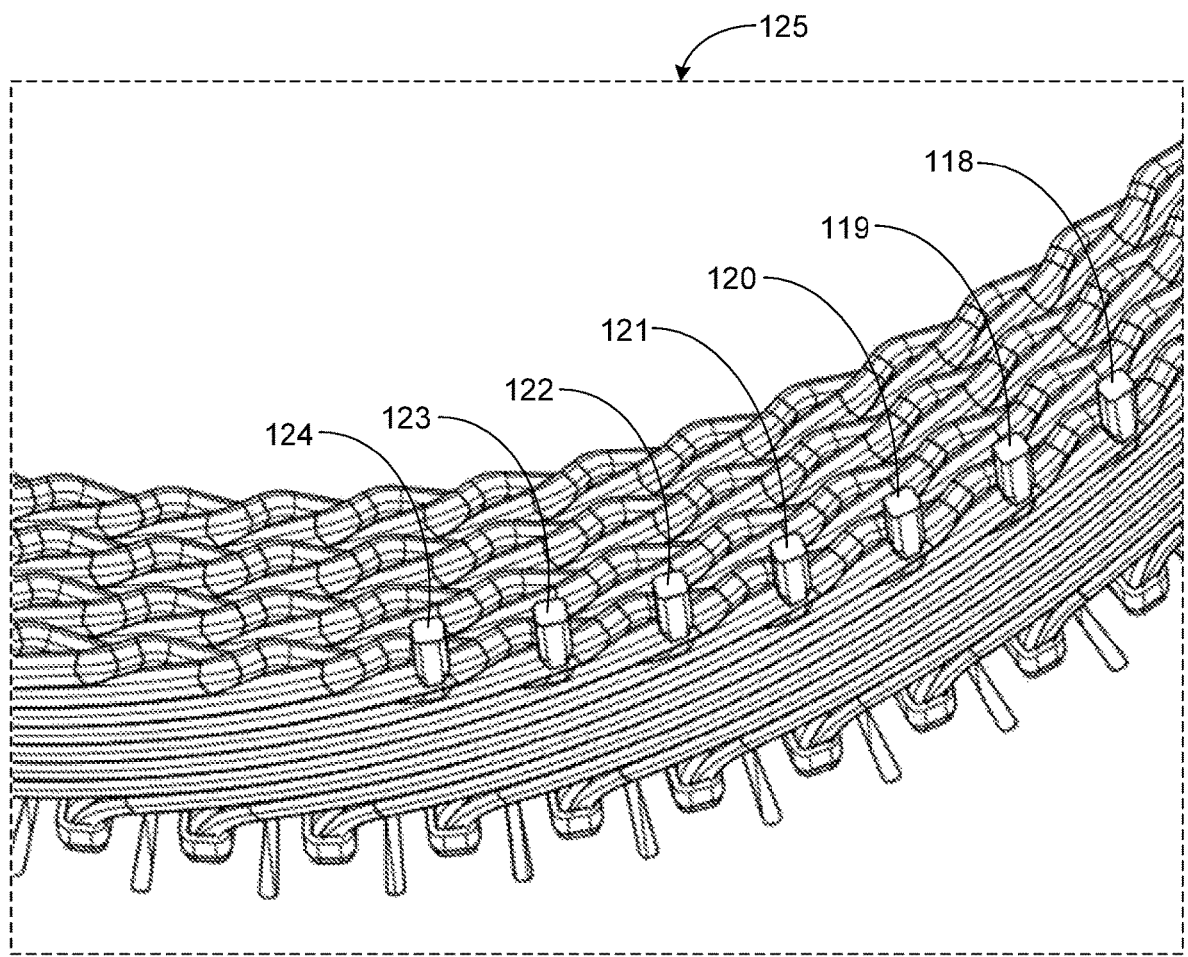
FIG. 2 provides a detailed perspective view of a portion of the stator shown in FIG. 1.

FIG. 1 provides a perspective view of an exemplary stator 100 that may be used with the connector of the invention. As shown, the windings of stator 100 terminate in 24 terminals 101-124. Additionally and as preferred, winding terminations 101-124 are immediately adjacent to one another as shown, thereby simplifying their connection to the connector described below. FIG. 2 provides a detailed perspective view of portion 125 of stator 100.

Figure 3:
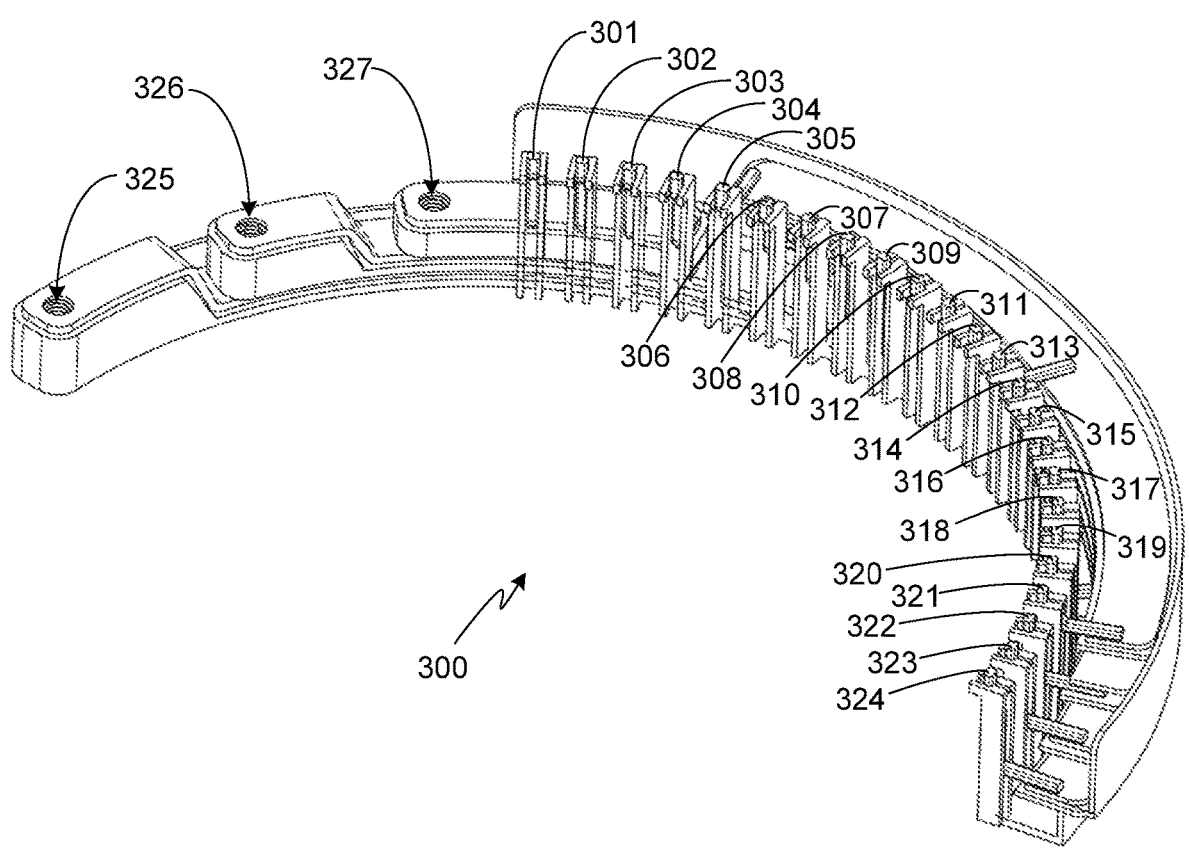
FIG. 3 provides a perspective view of a connector designed in accordance with the invention.

FIG. 3 provides a perspective view of a connector 300 designed in accordance with the invention. Connector 300 is comprised of an electrically conductive connector portion, preferably fabricated from copper, which couples to winding terminations 101-124 via termination coupling members 301-324. In the present exemplary embodiment, and as described further below, the conductive connector portion couples a first subset of the stator winding terminations to lug 325; a second subset of the stator winding terminations to lug 326; and a third subset of the stator winding terminations to lug 327. Additionally, and as described further below, the conductive connector portion of connector 300 also performs the function of the central node for four sets of winding circuits.

Figure 4:
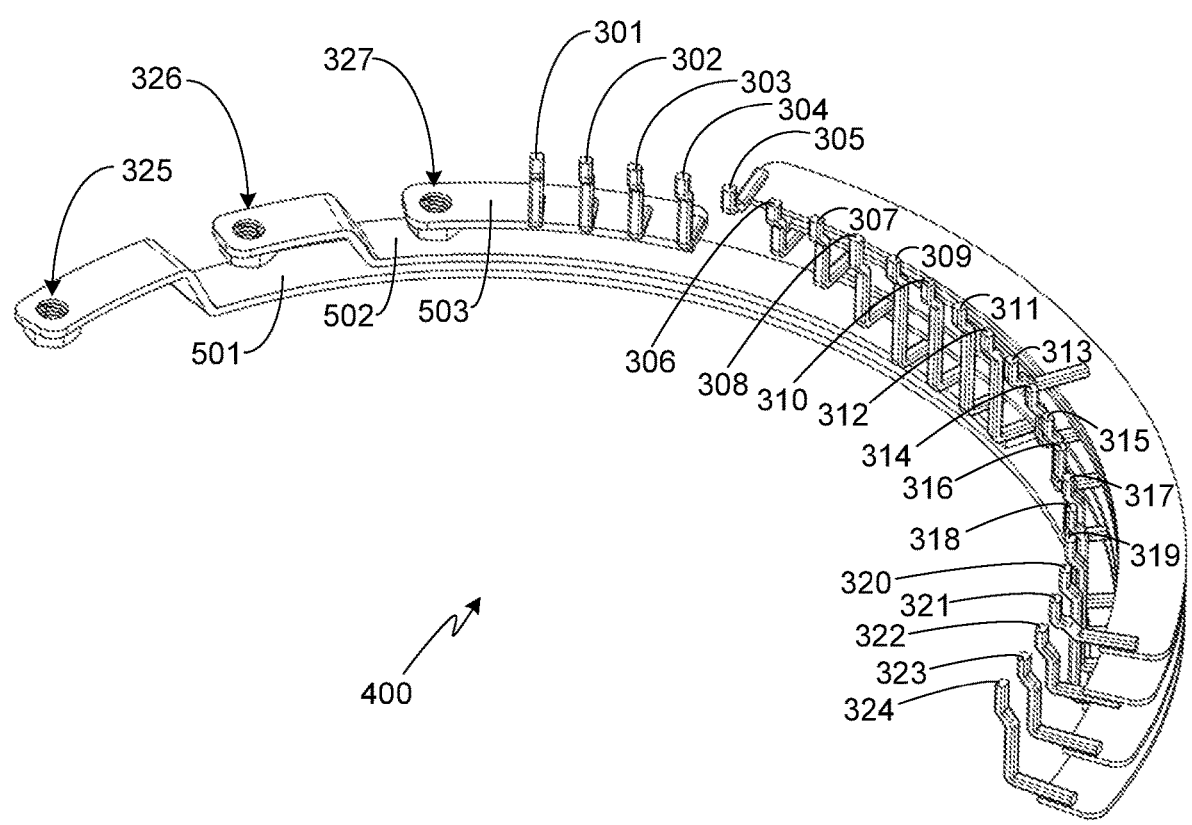
FIG. 4 provides a perspective view of the electrically conductive connector portion of the connector shown in FIG. 3.
Figure 5:
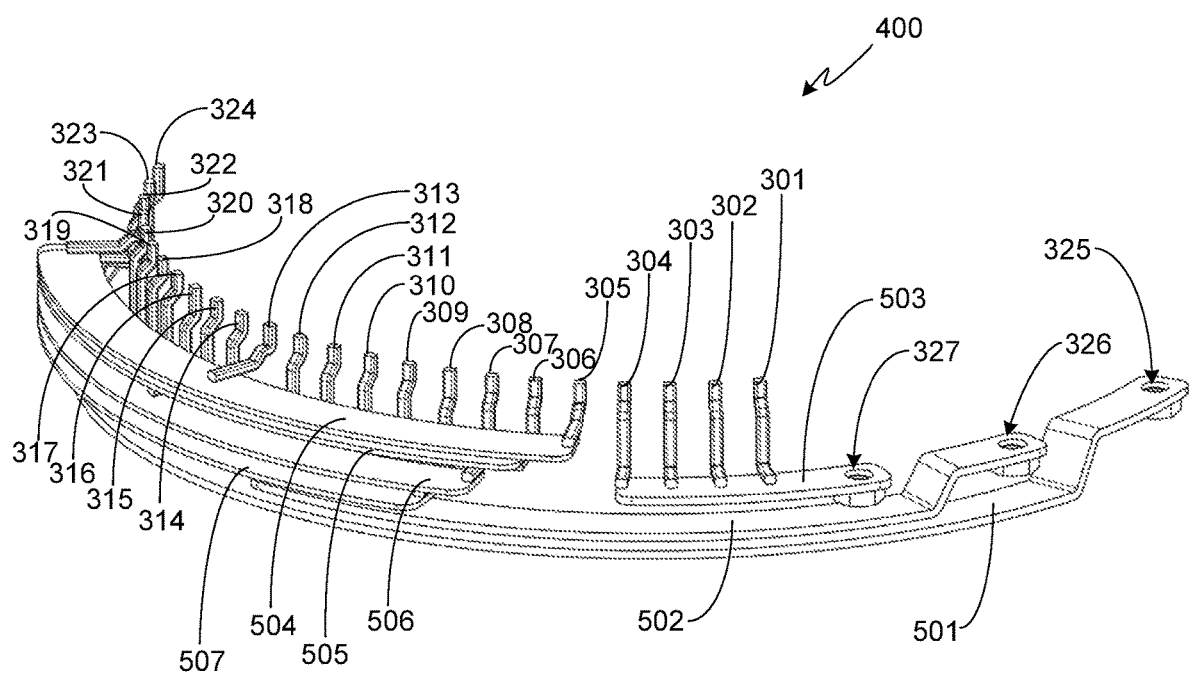
FIG. 5 provides a rear perspective view of the electrically conductive portion of the connector shown in FIG. 3.

FIG. 4 provides a perspective view of the electrically conductive connector portion 400 of connector 300. FIG. 5 provides a rear perspective view of connector portion 400. As shown in FIGS. 4 and 5, in this configuration there are seven bus bars 501-507. Bus bars 501-503 are connected to lugs 325-327, respectively. In this embodiment, each bus bar 501-503 is connected to four winding terminations. For example and as shown, bus bar 503 and therefore lug 327 is connected to termination coupling members 301-304 which, in turn, are connected to winding terminations 101-104 when the connector is attached to the stator windings. Thus for this aspect of the illustrated connector, termination coupling members 301-304 form an electrically conductive link between lug 327 and stator winding terminations 101-104. Each bus bar 504-507 is lugless (i.e., does not include a connecting lug) and is connected to three winding terminations and thus acts as the central node of the corresponding winding circuits. For example, in the figures bus bar 504 is shown connected to termination coupling members 305, 313 and 321 which, in turn, are connected to winding terminations 105, 113 and 121 after attachment of the connector to the stator windings.

Figure 6:
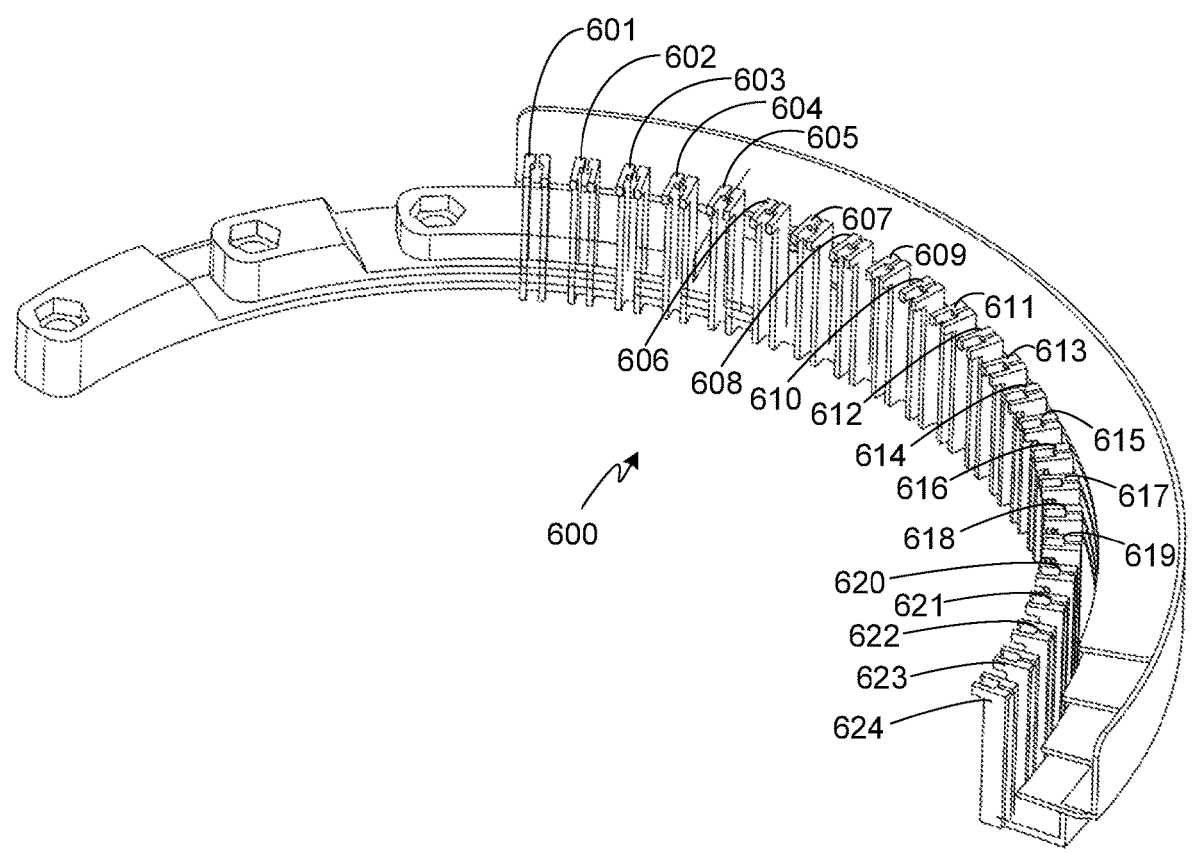
FIG. 6 provides a perspective view of the electrically insulating portion of the connector shown in FIG. 3.

In addition to the electrically conductive portion 400, connector 300 includes an electrically insulating portion. FIG. 6 provides a perspective view of electrically insulating portion 600. As shown in FIGS. 3 and 6, electrically insulating portion 600 is configured to separate bus bars 501-507 from each other, and to prevent termination coupling members 301-324 from inadvertently shorting to the wrong bus bar. Preferably insulating portion 600 is formed by inserting electrically conductive connector portion 400 into a plastic injection mold and over-molding portion 400 with a suitable electrically insulating plastic such as a thermosetting polyester material or an engineered thermoplastic (e.g., polypropylene).

In the embodiment of the electrically insulating portion 600 shown in FIG. 6, a plurality of insulating coupling member overlays 601-624 are provided that correspond to, and partially surround, corresponding termination coupling members 301-324. As a result of the approximately U-shaped design of each coupling member overlay, an electrically insulating barrier is provided between adjacent termination coupling members. Additionally, at least a portion of each overlay may be configured to extend beyond the sides of the corresponding winding termination, thereby further simplifying connector alignment relative to the stator winding terminations. In at least one embodiment, each overlay is sized such that it may be pinched or crimped onto the corresponding winding termination, thus helping to hold each coupling member to its corresponding winding termination during the process of attaching the connector to the stator windings.

Figure 7:
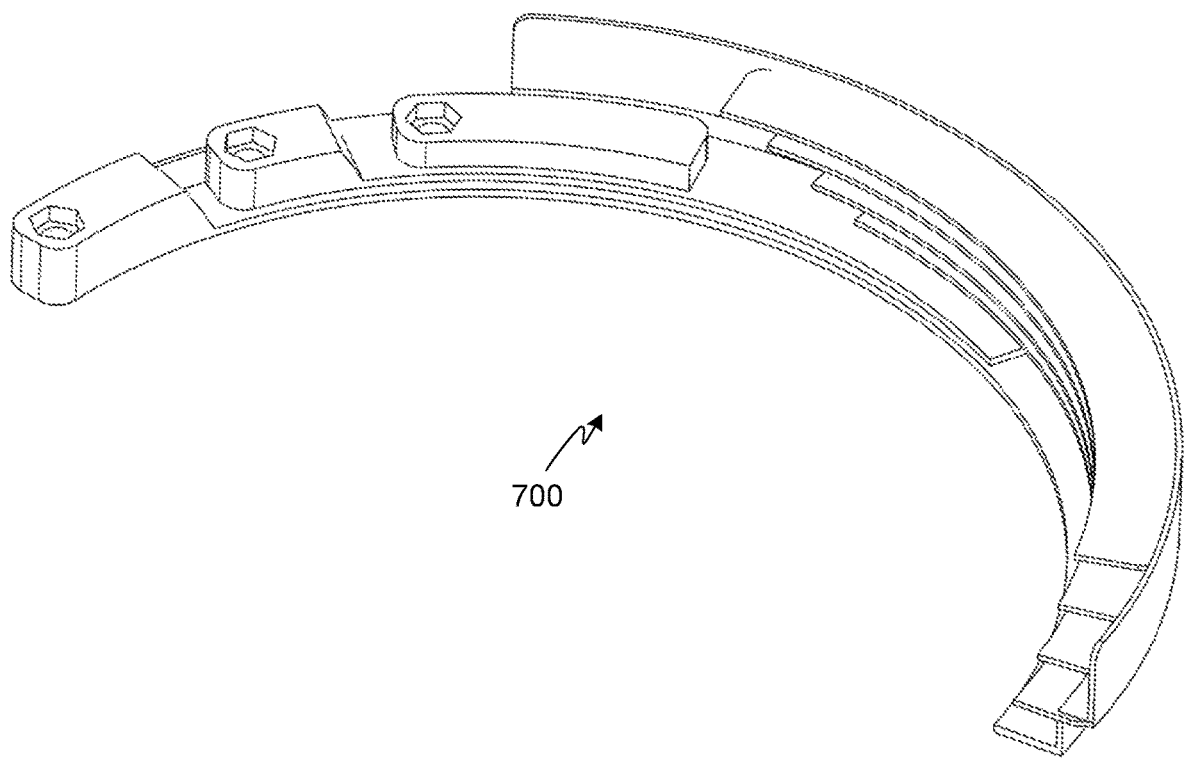
FIG. 7 provides a perspective view of an alternate electrically insulating portion that is equally applicable to the connector shown in FIG. 3.

It should be understood that the connector does not require the inclusion of insulating coupling member overlays (e.g., overlays 601-624). For example, FIG. 7 provides a perspective view of an alternate electrically insulating portion 700, equally applicable to the electrically conductive portion 400 of connector 300. As shown, this embodiment electrically insulates bus bars 501-507 from one another but does not include the insulating coupling member overlays.

Figure 8:
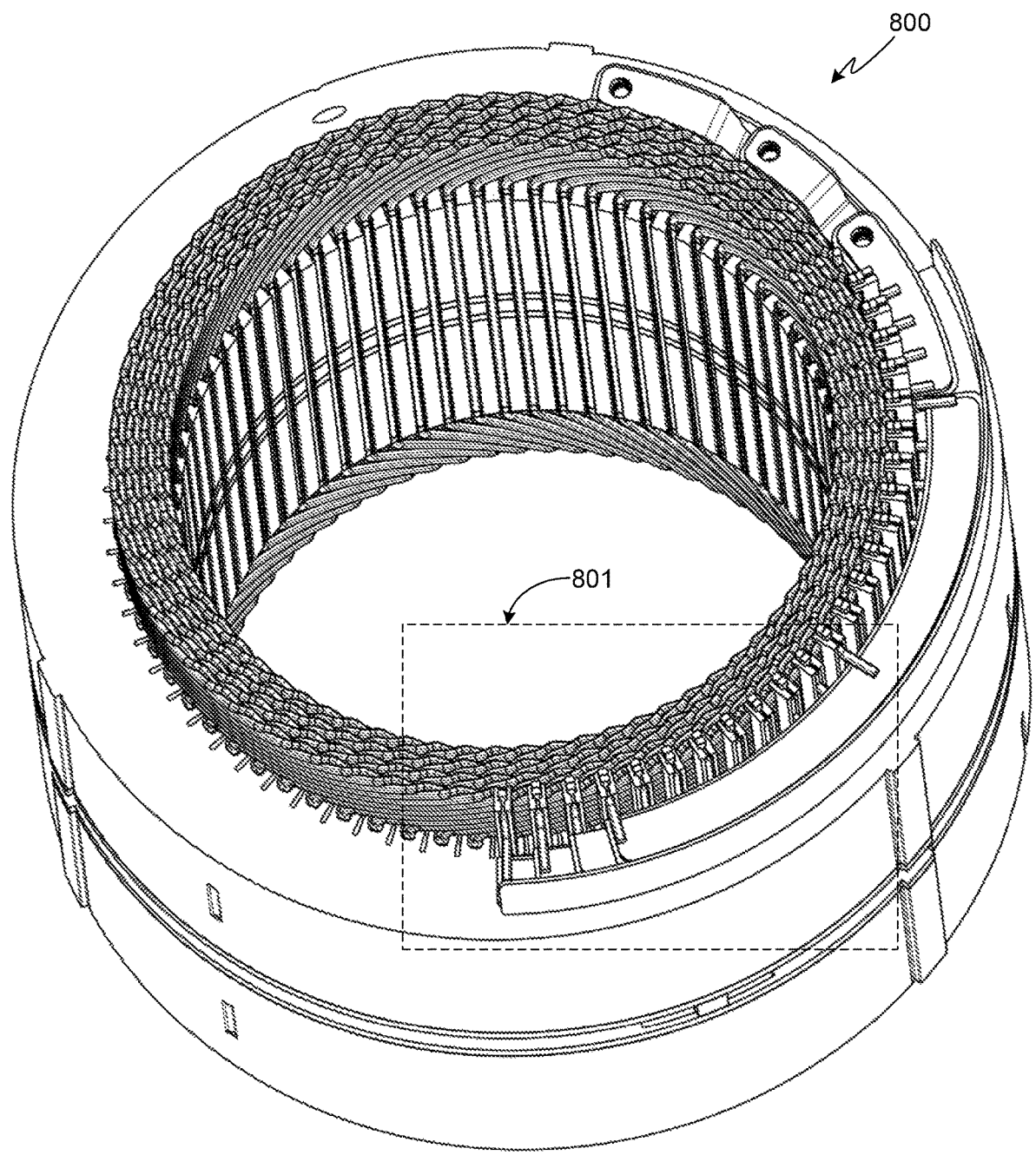
FIG. 8 provides a perspective view of a stator assembly that utilizes the stator shown in FIG. 1 and the connector shown in FIG. 3.
Figure 9:
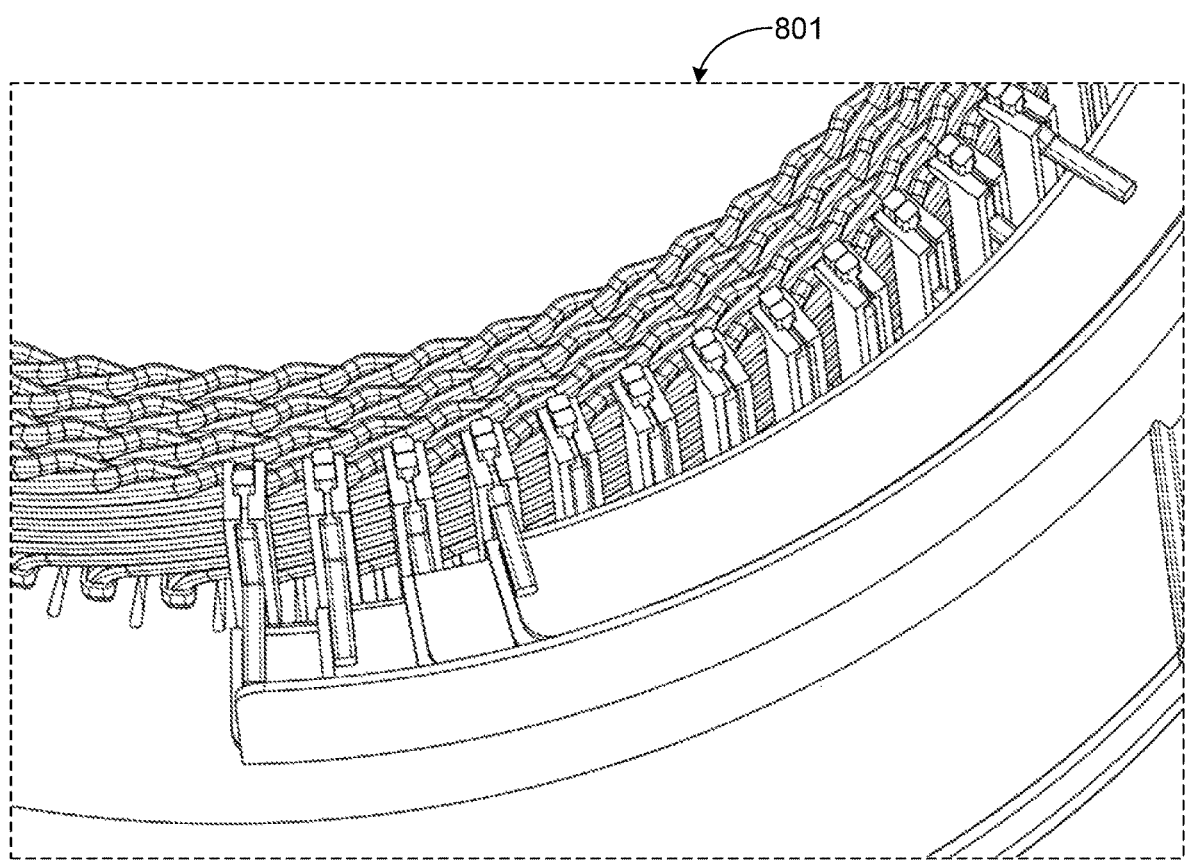
FIG. 9 provides a detailed perspective view of a portion of the stator assembly shown in FIG. 8.

After fabrication of connector 300, it is placed on top of stator assembly 100 such that each of the winding terminations (e.g., terminations 101-124) are aligned with, and in contact with, the corresponding termination coupling members (e.g., coupling members 301-324). FIG. 8 provides a perspective view of connector 300 attached to stator 100. FIG. 9 provides a detailed perspective view of portion 801 of stator assembly 800. Note that in the embodiment illustrated in FIGS. 8 and 9, the connector utilizes the insulating member shown in FIG. 6 that includes insulating coupling member overlays 601-624. As previously noted, while overlays 601-624 may aid during the connector alignment process, these overlays are not required.

Once connector 300 and termination coupling members 301-324 are properly positioned relative to winding terminations 101-124, each winding termination is then permanently coupled to the corresponding termination coupling member. Preferably the winding terminations are attached to the corresponding termination coupling members by laser welding. Alternately, tungsten inert gas (TIG) welding, resistance welding or brazing may be used to attach each termination coupling member to the corresponding winding termination. As previously noted, in at least one preferred embodiment connector 300 includes the approximately U-shaped coupling member overlays (e.g., overlays 601-624). In addition to electrically insulating adjacent winding terminations and adjacent winding coupling members, the termination coupling member overlays simplify connector alignment and can aid during the connector attachment process.

The connector of the invention offers a number of advantages over conventional techniques for connecting the stator windings of a motor to the coupling lugs. First and foremost, since the connector is designed to be fabricated as a separate component and then attached to the stator windings via a relatively quick process, a process that can be automated, the resultant stator assembly can be rapidly fabricated and at a lower cost. Thus the slow and tedious process of connecting the winding terminations to the stator lugs is replaced with a rapid manufacturing process that can be automated. Second, different connectors that couple the winding terminations to the bus bars in different configurations can be used to achieve different motor torque and power characteristics for the same set of stator windings. Similarly, different connectors can be used to alter the number of phases for a particular stator winding configuration, for example switching the number of phases from three to six. Third, the connector of the invention is very compact, thereby allowing the connector assembly to have minimal impact on the overall stator assembly diameter and length. Fourth, the connector is equally applicable to windings fabricated from round or rectangular wire.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A stator assembly for an electric motor, comprising:
  a stator with a plurality of windings circumferentially distributed about said stator, wherein said plurality of windings terminate in a plurality of winding terminations, wherein said plurality of winding terminations are positioned adjacent each other in a sector of the stator; and
  a pre-fabricated connector attached to said stator via said plurality of winding terminations, said pre-fabricated connector fabricated prior to attachment to said stator, said pre-fabricated connector as fabricated comprising:
    a first plurality of termination coupling members divided into a first plurality of termination coupling member groups, wherein each termination coupling member of each termination coupling member group of said first plurality of termination coupling member groups is configured to be mechanically and conductively coupled to a different winding termination of said plurality of winding terminations, wherein each termination coupling member group is mechanically and conductively coupled to one of a plurality of bus bars, and wherein each bus bar of said plurality of bus bars includes an independent lug; and an electrically insulating material overlaying portions of said plurality of bus bars, said electrically insulating material configured to prevent contact between said plurality of bus bars.

2. The stator assembly of claim 1, wherein each termination coupling member of each termination coupling member group of said first plurality of termination coupling member groups is laser welded to said different winding termination of said plurality of winding terminations during attachment of said pre-fabricated connector to said stator.

3. The stator assembly of claim 1, wherein each termination coupling member of each termination coupling member group of said first plurality of termination coupling member groups is tungsten inert gas (TIG) welded to said different winding termination of said plurality of winding terminations during attachment of said pre-fabricated connector to said stator.

4. The stator assembly of claim 1, wherein each termination coupling member of each termination coupling member group of said first plurality of termination coupling member groups is resistance welded to said different winding termination of said plurality of winding terminations during attachment of said pre-fabricated connector to said stator.

5. The stator assembly of claim 1, wherein each termination coupling member of each termination coupling member group of said first plurality of termination coupling member groups is brazed to said different winding termination of said plurality of winding terminations during attachment of said pre-fabricated connector to said stator.

6. The stator assembly of claim 1, wherein each of said first plurality of termination coupling members is fabricated from a copper material, and wherein each of said plurality of bus bars is fabricated from said copper material.

7. The stator assembly of claim 1, wherein at least a portion of said plurality of bus bars are over-molded with said electrically insulating material.

8. The stator assembly of claim 1, wherein a plastic material is selected as said electrically insulating material used to form said pre-fabricated connector.

9. The stator assembly of claim 1, said plurality of windings comprised of copper wire with a round cross-section.

10. The stator assembly of claim 1, said plurality of windings comprised of copper wire with a rectangular cross-section.

11. The stator assembly of claim 1, wherein each bus bar of said plurality of bus bars corresponds to a phase of said electric motor.

12. A stator assembly for an electric motor, comprising:
a stator with a plurality of windings circumferentially distributed about said stator, wherein said plurality of windings terminate in a plurality of winding terminations; and
a pre-fabricated connector attached to said stator via said plurality of winding terminations, said pre-fabricated connector fabricated prior to attachment to said stator, said pre-fabricated connector as fabricated comprising:
a first plurality of termination coupling members divided into a first plurality of termination coupling member groups, wherein each termination coupling member of each termination coupling member group of said first plurality of termination coupling member groups is configured to be mechanically and conductively coupled to a different winding termination of said plurality of winding terminations, wherein each termination coupling member group is mechanically and conductively coupled to one of a plurality of bus bars, and wherein each bus bar of said plurality of bus bars includes an independent lug;
an electrically insulating material overlaying portions of said plurality of bus bars, said electrically insulating material configured to prevent contact between said plurality of bus bars; and
a plurality of electrically insulating coupling member overlays, said plurality of electrically insulating coupling member overlays configured to prevent contact between said first plurality of termination coupling members.

13. The stator assembly of claim 12, each of said plurality of electrically insulating coupling member overlays further comprising a U-shaped portion configured to partially surround a corresponding winding termination of said plurality of winding terminations.

14. The stator assembly of claim 13, wherein each U-shaped portion is crimped onto said corresponding winding termination during attachment of said pre-fabricated connector to said stator.

15. A stator assembly for an electric motor, comprising:
a stator with a plurality of windings circumferentially distributed about said stator, wherein said plurality of windings terminate in a plurality of winding terminations; and
a pre-fabricated connector attached to said stator via said plurality of winding terminations, said pre-fabricated connector fabricated prior to attachment to said stator, said pre-fabricated connector as fabricated comprising:
a first plurality of termination coupling members divided into a first plurality of termination coupling member groups, wherein each termination coupling member of each termination coupling member group of said first plurality of termination coupling member groups is configured to be mechanically and conductively coupled to a different winding termination of said plurality of winding terminations, wherein each termination coupling member group is mechanically and conductively coupled to one of a plurality of bus bars, and wherein each bus bar of said plurality of bus bars includes an independent lug;
an electrically insulating material overlaying portions of said plurality of bus bars, said electrically insulating material configured to prevent contact between said plurality of bus bars; and
a second plurality of termination coupling members divided into a second plurality of termination coupling member groups, wherein each termination coupling member of each termination coupling member group of said second plurality of termination coupling member groups is configured to be mechanically and conductively coupled to a different winding termination of said plurality of winding terminations, wherein each termination coupling member group of said second plurality of termination coupling member groups is mechanically and conductively coupled to one of a plurality of lugless bus bars, said electrically insulating material configured to prevent contact between said plurality of lugless bus bars, and said electrically insulating material configured to prevent contact between said plurality of bus bars and said plurality of lugless bus bars.

16. The stator assembly of claim 15, wherein each termination coupling member of each termination coupling member group of said first plurality of termination coupling member groups is laser welded to said different winding termination of said plurality of winding terminations during attachment of said pre-fabricated connector to said stator, and wherein each termination coupling member of each termination coupling member group of said second plurality of termination coupling member groups is laser welded to said different winding termination of said plurality of winding terminations during attachment of said pre-fabricated connector to said stator.

17. The stator assembly of claim 15, wherein each termination coupling member of each termination coupling member group of said first plurality of termination coupling member groups is tungsten inert gas (TIG) welded to said different winding termination of said plurality of winding terminations during attachment of said pre-fabricated connector to said stator, and wherein each termination coupling member of each termination coupling member group of said second plurality of termination coupling member groups is TIG welded to said different winding termination of said plurality of winding terminations during attachment of said pre-fabricated connector to said stator.

18. The stator assembly of claim 15, wherein each termination coupling member of each termination coupling member group of said first plurality of termination coupling member groups is resistance welded to said different winding termination of said plurality of winding terminations during attachment of said pre-fabricated connector to said stator, and wherein each termination coupling member of each termination coupling member group of said second plurality of termination coupling member groups is resistance welded to said different winding termination of said plurality of winding terminations during attachment of said pre-fabricated connector to said stator.

19. The stator assembly of claim 15, wherein each termination coupling member of each termination coupling member group of said first plurality of termination coupling member groups is brazed to said different winding termination of said plurality of winding terminations during attachment of said pre-fabricated connector to said stator, and wherein each termination coupling member of each termination coupling member group of said second plurality of termination coupling member groups is brazed to said different winding termination of said plurality of winding terminations during attachment of said pre-fabricated connector to said stator.

20. The stator assembly of claim 15, further comprising a plurality of electrically insulating coupling member overlays, said plurality of electrically insulating coupling member overlays configured to prevent contact between said first plurality of termination coupling members, said plurality of electrically insulating coupling member overlays configured to prevent contact between said second plurality of termination coupling members, and said plurality of electrically insulating coupling member overlays configured to prevent contact between said first plurality of termination coupling members and said second plurality of termination coupling members.

21. The stator assembly of claim 20, each of said plurality of electrically insulating coupling member overlays further comprising a U-shaped portion configured to partially surround a corresponding winding termination of said plurality of winding terminations.

22. The stator assembly of claim 21, wherein each U-shaped portion is crimped onto said corresponding winding termination during attachment of said pre-fabricated connector to said stator.

23. A stator assembly for an electric motor, comprising:
a stator with a plurality of windings circumferentially distributed about said stator, wherein said plurality of windings terminate in a plurality of winding terminations; and
a pre-fabricated connector attached to said stator via said plurality of winding terminations, said pre-fabricated connector fabricated prior to attachment to said stator, said pre-fabricated connector as fabricated comprising:
a first plurality of termination coupling members divided into a first plurality of termination coupling member groups, wherein each termination coupling member of each termination coupling member group of said first plurality of termination coupling member groups is configured to be mechanically and conductively coupled to a different winding termination of said plurality of winding terminations, wherein each termination coupling member group is mechanically and conductively coupled to one of a plurality of bus bars, and wherein each bus bar of said plurality of bus bars includes an independent lug, the plurality of bus bars stacked axially with regard to the stator; and
an electrically insulating material overlaying portions of said plurality of bus bars, said electrically insulating material configured to prevent contact between said plurality of bus bars.

24. The stator assembly of claim 23, further comprising a plurality of electrically insulating coupling member overlays, said plurality of electrically insulating coupling member overlays configured to prevent contact between said first plurality of termination coupling members.

25. The stator assembly of claim 23, said pre-fabricated connector as fabricated further comprising a second plurality of termination coupling members divided into a second plurality of termination coupling member groups, wherein each termination coupling member of each termination coupling member group of said second plurality of termination coupling member groups is configured to be mechanically and conductively coupled to a different winding termination of said plurality of winding terminations, wherein each termination coupling member group of said second plurality of termination coupling member groups is mechanically and conductively coupled to one of a plurality of lugless bus bars, said electrically insulating material configured to prevent contact between said plurality of lugless bus bars, and said electrically insulating material configured to prevent contact between said plurality of bus bars and said plurality of lugless bus bars.

* * * * *

UNITED STATES PATENT AND TRADEMARK OFFICE
CERTIFICATE OF CORRECTION

PATENT NO. : 11,133,719 B2
APPLICATION NO. : 16/453029
DATED : September 28, 2021
INVENTOR(S) : Mayer et al.

Page 1 of 1

It is certified that error appears in the above-identified patent and that said Letters Patent is hereby corrected as shown below:

On the Title Page

On Page 2, Column 2, item (56), under "OTHER PUBLICATIONS", Line 2, delete "20174733A," and insert -- 20174733.4, --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*